United States Patent
Baughman et al.

(10) Patent No.: US 11,334,634 B2
(45) Date of Patent: May 17, 2022

(54) CONVERSATION BASED DYNAMIC FUNCTIONAL SETTINGS

(71) Applicant: International Business Machines Corporation, Armonk, NY (US)

(72) Inventors: Aaron K. Baughman, Research Triangle Park, NC (US); Martin G. Keen, Research Triangle Park, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 542 days.

(21) Appl. No.: 16/389,183

(22) Filed: Apr. 19, 2019

(65) Prior Publication Data

US 2020/0334306 A1 Oct. 22, 2020

(51) Int. Cl.
  *G06F 16/00* (2019.01)
  *G06F 16/9535* (2019.01)
  *G06N 3/08* (2006.01)
  *G06F 3/06* (2006.01)
  *G06N 20/20* (2019.01)

(52) U.S. Cl.
  CPC ........ *G06F 16/9535* (2019.01); *G06F 3/0607* (2013.01); *G06F 3/067* (2013.01); *G06F 3/0643* (2013.01); *G06N 3/08* (2013.01); *G06N 20/20* (2019.01)

(58) Field of Classification Search
  None
  See application file for complete search history.

(56) References Cited

U.S. PATENT DOCUMENTS

| 9,531,655 | B1 | 12/2016 | Buchheit | |
|---|---|---|---|---|
| 2012/0179751 | A1* | 7/2012 | Ahn | G06Q 30/0282 709/204 |
| 2015/0066479 | A1 | 3/2015 | Pasupalak et al. | |
| 2016/0063874 | A1 | 3/2016 | Czerwinski et al. | |
| 2016/0232244 | A1 | 8/2016 | Liu et al. | |
| 2017/0192401 | A1* | 7/2017 | Wexler | G06K 9/00671 |
| 2017/0277993 | A1* | 9/2017 | Beaver | G06F 40/40 |
| 2018/0101776 | A1* | 4/2018 | Osotio | G06F 16/258 |
| 2018/0357286 | A1* | 12/2018 | Wang | G06F 16/24578 |

OTHER PUBLICATIONS

P. Mell, et al. "The NIST Definition of Cloud Computing", NIST Special Publication 800-145, Sep. 2011, Gaithersburg, MD.

* cited by examiner

Primary Examiner — Anhtai V Tran
(74) Attorney, Agent, or Firm — Randy Emilio Tejeda; George S. Blasiak; Heslin Rothenberg Farley & Mesiti PC

(57) ABSTRACT

Methods, computer program products, and systems are presented. The method computer program products, and systems can include, for instance: receiving conversation data of a user from a data source, the data source being provided be a voice enabled personal assistant (VEPA); processing the conversation data to return a sentiment parameter value and a topic parameter value for the conversation data; updating one or more functional setting of a computing environment in dependence on the sentiment parameter value and the topic parameter value; receiving subsequent conversation data from the data source; and processing the subsequent conversation data in accordance with the updated one or more functional setting.

20 Claims, 8 Drawing Sheets

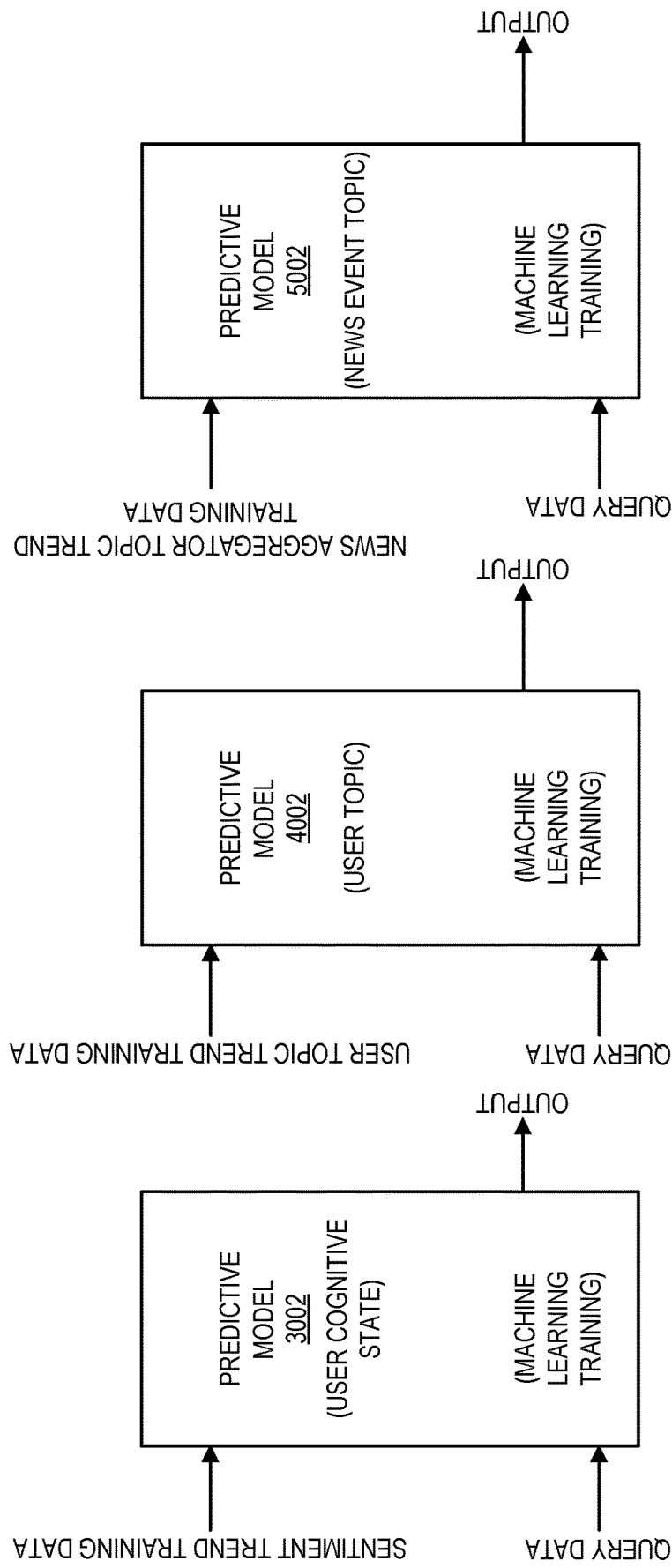

CONVERSATION BASED DYNAMIC FUNCTIONAL SETTINGS

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: receiving conversation data of a user from a data source, the data source being provided be a voice enabled personal assistant (VEPA); processing the conversation data to return a sentiment parameter value and a topic parameter value for the conversation data; updating one or more functional setting of a computing environment in dependence on the sentiment parameter value and the topic parameter value; receiving subsequent conversation data from the data source; and processing the subsequent conversation data in accordance with the updated one or more functional setting.

In another aspect, a computer program product can be provided. The computer program product can include a computer readable storage medium readable by one or more processing circuit and storing instructions for execution by one or more processor for performing a method. The method can include, for example: receiving conversation data of a user from a data source, the data source being provided be a voice enabled personal assistant (VEPA); processing the conversation data to return a sentiment parameter value and a topic parameter value for the conversation data; updating one or more functional setting of a computing environment in dependence on the sentiment parameter value and the topic parameter value; receiving subsequent conversation data from the data source; and processing the subsequent conversation data in accordance with the updated one or more functional setting.

In a further aspect, a system can be provided. The system can include, for example a memory. In addition, the system can include one or more processor in communication with the memory. Further, the system can include program instructions executable by the one or more processor via the memory to perform a method. The method can include, for example: receiving conversation data of a user from a data source, the data source being provided be a voice enabled personal assistant (VEPA); processing the conversation data to return a sentiment parameter value and a topic parameter value for the conversation data; updating one or more functional setting of a computing environment in dependence on the sentiment parameter value and the topic parameter value; receiving subsequent conversation data from the data source; and processing the subsequent conversation data in accordance with the updated one or more functional setting.

Shortcomings of the prior art are overcome, and additional advantages are provided, through the provision, in one aspect, of a method. The method can include, for example: receiving conversation data of a user from a data source, the data source being provided be a voice enabled personal assistant (VEPA); processing the conversation data to return a sentiment parameter value; updating one or more functional setting of a computing environment in dependence on the sentiment parameter value; receiving subsequent conversation data from the data source; and processing the subsequent conversation data in accordance with the updated one or more functional setting.

In another aspect, a computer program product can be provided. The computer program product can include a computer readable storage medium readable by one or more processing circuit and storing instructions for execution by one or more processor for performing a method. The method can include, for example: receiving conversation data of a user from a data source, the data source being provided be a voice enabled personal assistant (VEPA); processing the conversation data to return a sentiment parameter value; updating one or more functional setting of a computing environment in dependence on the sentiment parameter value; receiving subsequent conversation data from the data source; and processing the subsequent conversation data in accordance with the updated one or more functional setting.

In a further aspect, a system can be provided. The system can include, for example a memory. In addition, the system can include one or more processor in communication with the memory. Further, the system can include program instructions executable by the one or more processor via the memory to perform a method. The method can include, for example: receiving conversation data of a user from a data source, the data source being provided be a voice enabled personal assistant (VEPA); processing the conversation data to return a sentiment parameter value; updating one or more functional setting of a computing environment in dependence on the sentiment parameter value; receiving subsequent conversation data from the data source; and processing the subsequent conversation data in accordance with the updated one or more functional setting.

Shortcomings of the prior art are overcome, and additional advantages are provided, through the provision, in one aspect, of a method. The method can include, for example: receiving conversation data of a user from a data source, the data source being provided be a voice enabled personal assistant (VEPA); processing the conversation data to return topic parameter value for the conversation data; updating one or more functional setting of a computing environment in dependence on the topic parameter value; receiving subsequent conversation data from the data source; and processing the subsequent conversation data in accordance with the updated one or more functional setting.

In another aspect, a computer program product can be provided. The computer program product can include a computer readable storage medium readable by one or more processing circuit and storing instructions for execution by one or more processor for performing a method. The method can include, for example: receiving conversation data of a user from a data source, the data source being provided be a voice enabled personal assistant (VEPA); processing the conversation data to return a topic parameter value for the conversation data; updating one or more functional setting of a computing environment in dependence on the topic parameter value; receiving subsequent conversation data from the data source; and processing the subsequent conversation data in accordance with the updated one or more functional setting.

In a further aspect, a system can be provided. The system can include, for example a memory. In addition, the system can include one or more processor in communication with the memory. Further, the system can include program instructions executable by the one or more processor via the memory to perform a method. The method can include, for example: receiving conversation data of a user from a data source, the data source being provided be a voice enabled personal assistant (VEPA); processing the conversation data to return a topic parameter value for the conversation data; updating one or more functional setting of a computing environment in dependence on the topic parameter value; receiving subsequent conversation data from the data source; and processing the subsequent conversation data in accordance with the updated one or more functional setting.

Shortcomings of the prior art are overcome, and additional advantages are provided, through the provision, in one aspect, of a method. The method can include, for example: receiving conversation data of a user from a data source, the data source being provided be a voice enabled personal assistant (VEPA); processing the conversation data to return a cognitive state parameter value; updating one or more functional setting of a computing environment in dependence on the cognitive state parameter value; receiving subsequent conversation data from the data source; and processing the subsequent conversation data in accordance with the updated one or more functional setting.

In another aspect, a computer program product can be provided. The computer program product can include a computer readable storage medium readable by one or more processing circuit and storing instructions for execution by one or more processor for performing a method. The method can include, for example: receiving conversation data of a user from a data source, the data source being provided be a voice enabled personal assistant (VEPA); processing the conversation data to return a cognitive state parameter value; updating one or more functional setting of a computing environment in dependence on the cognitive state parameter value; receiving subsequent conversation data from the data source; and processing the subsequent conversation data in accordance with the updated one or more functional setting.

In a further aspect, a system can be provided. The system can include, for example a memory. In addition, the system can include one or more processor in communication with the memory. Further, the system can include program instructions executable by the one or more processor via the memory to perform a method. The method can include, for example: receiving conversation data of a user from a data source, the data source being provided be a voice enabled personal assistant (VEPA); processing the conversation data to return a cognitive state parameter value; updating one or more functional setting of a computing environment in dependence on the cognitive state parameter value; receiving subsequent conversation data from the data source; and processing the subsequent conversation data in accordance with the updated one or more functional setting.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 is a flowchart illustrating a method for performance by a manager system according to one embodiment;

FIG. 4 is a flowchart illustrating a method for performance by a manager system interoperating with other components according to one embodiment;

FIG. 5 depicts an administrator user interface according to one embodiment;

DETAILED DESCRIPTION

Figure 1:
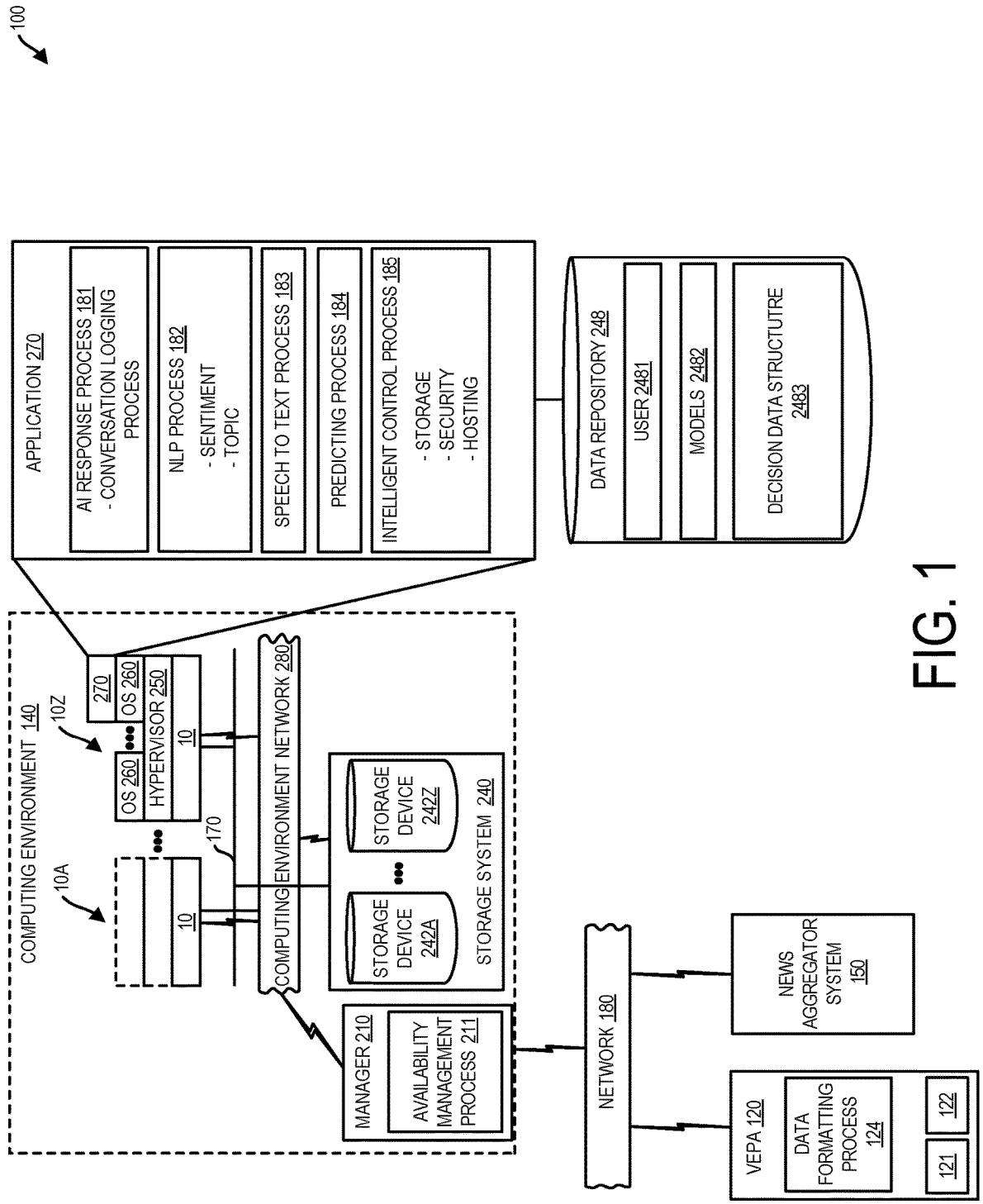
FIG. 1 depicts a system having a manager system, client computer devices, and an administrator client computer device according to one embodiment.

System 100 for use in making data decisions and altering processing based on the data decision is shown in FIG. 1. System 100 can include voice enabled personal assistant (VEPA) 120, computing environment 140, and news aggregator system 150. VEPA 120, computing environment 140, and news aggregator system 150 can be in communication with one another via network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

According to one example, VEPA 120 can be remote and external from computing environment 140 and news aggregator system 150. According to another example, VEPA 120 can be co-located with computing environment 140 and/or news aggregator system 150. Computing environment 140 can support functions of voice activated process run by VEPA 120. VEPA 120 can be configured for fixed position operation, e.g. tabletop operation or can be configured for mobile, e.g. handheld mobile operation.

VEPA 120 can run one or more voice activated process. Voice activated processes can be developed, e.g. for control of home appliances, home climate control, home video equipment, voice activation of purchase transactions, voice activated music listening services, and data lookup and research services. VEPA 120 can include audio input device 121, e.g. a microphone, for pickup of conversation data and one or more audio output device 122, e.g. a speaker. VEPA 120 can also run data formatting process 124 to format audio input data into data packets for transmission to computing environment 140 which can support operations of VEPA 120. VEPA 120 can be provided, e.g. by a commercially available voice enabled product referred to as a "personal assistant", "digital assistant" or "virtual assistant". VEPA 120 can be referred to as a "personal assistant", "digital assistant" or "virtual assistant".

Conversation data herein can include voice based data picked up by audio input device 121 when a user in pickup range of VEPA 120 is interacting with and in conversation with VEPA 120. Conversation data herein can include voice based data picked up by audio input device 121 when a user in pickup range of VEPA 120 is interacting with and in conversation with another user. Conversation data herein can include text data converted from voice based data that defines conversation data. Conversation data can be sent by VEPA 120 for receipt by computing environment 140, e.g. by application 270.

Conversation data herein and all other data as set forth herein that is used by system 100 can be provided by (a) data which is obtained from a user based on consent of the user and/or (b) publicly available data. Data obtained from a user based on consent of the user can be data provided e.g. as part of a subscription service agreement, or other agreement in connection with the activation of VEPA 120.

News aggregator system 150 can be provided by a news aggregator configured with appropriate software for aggregating syndicated web content such as online new papers, blogs, podcasts in a central location for easy access. News aggregator system 150 can include a rich site summary (RSS) synchronized subscription system. RSS uses extensible markup language (XML) to structure pieces of information to be aggregated in a feed reader. Distributed updates can include e.g. journal tables of contents, podcasts, videos, and news items. News aggregator system 150 can include human selected and entered content as well as automatically selected content, selected with use of auto-selection algorithms. Rich site summary (RSS) feeds can include text and metadata that specifies such information as publishing date and author name.

Computing environment 140 can include a plurality of computing nodes 10, which can be provided by physical computing nodes. The respective computing nodes 10 can have software running thereon defining computing node stacks 10A-10Z. Software defining the respective instances of computing node stacks 10A-10Z can be differentiated between the computing node stacks, e.g. some stacks can provide traditional air metal machine operation, other stacks can include a hypervisor that supports a plurality of guest operating systems (OS) defining respective guest hypervisor based virtual machines (VMs), other stacks can include container based VMs, e g running on top of a hypervisor based VM or running on a computing node stack that is absent of a hypervisor. A plurality of different configurations are possible.

Computing environment 140 in addition to having computing node stacks 10A-10Z can include manager 210 that runs availability management process 211. Manager 210 running availability management process 211 can adjust a hosting configuration for a given application to achieve a specified Service Level Agreement (SLA) requirement. Manager 210 running availability management process 211 can adjust an availability rating for a given application, e.g. by migrating the application to a different computing node stack of computing environment 140, adding instances of the application, and/or subtracting instances of application.

Referring to further aspects of computing environment 140, computing environment 140 can include storage system 240. Storage system 240 can include storage devices 242A-242Z, which can be provided by physical storage devices. Physical storage devices of storage system 240 can include associated controllers. Storage devices 242A-242Z can be provided, e.g. by hard disks and Solid-State Storage Devices (SSDs). Storage system 240 can be in communication with computing node stacks 10A-10Z by way of a Storage Area Network (SAN) and/or a Network Attached Storage (NAS) link.

According to one embodiment, computing environment 140 can include fibre channel network 170 providing communication between respective computing node stacks 10A-10Z and storage system 240. Fibre channel network 170 can include a physical fibre channel that runs the fibre channel protocol to define a SAN. NAS access to storage system 240 can be provided by computing environment network 280 which can be an IP based network. Manager 210 can be in communication with computing node stacks 10A-10Z, by way of computing environment network 280.

Computing environment 140 can be configured to provide cloud computing services. Computing environment 140 can be provided, e.g. by one or more data center. Computing environment 140 can host application 270 for supporting operations of VEPA 120 running a voice activated process. Application 270 is shown as being hosted by computing node stack 10Z having a particular hosting configuration for illustrative purposes. However, it is understood that application 270 can be migrated to a different computing node stack or that the particular provisioning of computing node stack 10Z can be dynamically changed and further instances of application 270 can be increased or decreased. In the particular computing node stack 10Z, application 270 runs on a guest operating system (OS) 260 defining a hypervisor based VM, which hypervisor based VM runs on hypervisor 250, which hypervisor runs on computing node 10, which can be provided by physical computing node.

Application 270 can run various processes including as depicted AI response process 181, NLP process 182, speech to text process 183, predicting process 184, and intelligent control process 185.

Application 270 running AI response process 181 can perform various functions, e.g. can recognize a particular user's voice, e.g. a user of VEPA 120, and based on the recognizing can access resources for predicting behavior of the user. For performing such functions, AI response process 181 can store a corpus of conversation data of the user. Stored conversation data can be, e.g. voice based and/or text based. Accordingly, AI response process 181 can run a conversation logging process, wherein conversation data is stored into storage system 240 for later use by application 270. VEPA 120 can be interacted with using voice commands by a mobile device user. These interactions can be single utterance ("what is the weather today?"), or conversational involving back-and-forth between the user and the digital assistant ("what's on my calendar today?", "OK reschedule my 10 am meeting").

Embodiments herein recognize that as VEPAs (digital assistants) become smarter, storing conversation data as well as data associated with retrieval becomes important for recall later. This enables the digital assistant to quickly and securely apply context based on conversations that have happened in the past. For example, a user may initially ask "how did my team the Utopia Wildcats do this week?", then the following week ask, "how did my team do?". The digital assistant can recall the previous conversation to establish which team the user is referring to. Embodiments herein addresses how these conversations along with content retrieved to answer a question with a digital assistant are stored and protected. It describes a system that can analyze both a user's tone of voice and choice of words to derive the importance and privacy of a given conversation and assigns appropriate functional settings such as storage settings and security settings e.g. encryption level setting and other functional settings based upon this analysis. This ensures that important information is stored in storage arrays, quick access, cost effective solutions with the most appropriate redundancy, and that highly private information is stored with the highest levels of encryption.

Embodiments herein recognize that storage of conversation data according to a predetermined process can yield disadvantages including security risk. Embodiments herein recognize, for example, that routine conversations of users can have various degrees of criticality with higher degrees of criticality being associated with greater security risk. For example, even in everyday conversation users of VEPA 120 can communicate sensitive conversation data, such as data relating, e.g. to monetary exchanges, technology related trade secrets, health treatment condition care, and the like. According to one aspect, embodiments herein set forth to store conversation data for support of operations of VEPA 120 according to an intelligent process, e.g. so that one or more functional setting of a computing environment can be update. A functional setting can include a functional setting so that e.g. more sensitive data can be stored differently than less sensitive data, can be subject to difference security processing and/or can be hosted differently.

Application 270 running NLP process 182 can determine, e.g. sentiment and topics from sample conversation data. Application 270 can run NLP process 182 to process data for preparation of records that are stored in data repository 248 and for other purposes.

Application 270 can run NLP process 182 for determining a value of one or more NLP output parameter of a message. NLP process 182 can include one or more of a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness," a topic classification process that determines topics of messages and output one or more topic NLP output parameter, or other classification process for output of one or more other NLP output parameters e.g. one of more "social tendency" NLP output parameter or one or more "writing style" NLP output parameter. Application 270 can run NLP process 182 to determine a cognitive state. Application 270 running NLP process 182 to determine a cognitive state can include application 270 running NLP process to determine one or more sentiment parameter value for a user.

By running of NLP process 182, application 270 can perform a number of processes including one or more of (a) sentiment classification and output of one or more sentiment NLP output parameter for a received message (b) topic classification and output of one or more topic NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Application 270 running NLP process 182 can include application 270 returning NLP output parameters in addition to those specified of cognitive state (provided e.g. by sentiment) and topic, e.g. can provide sentence segmentation tags, and part of speech tags. Application 270 can use sentence segmentation parameters to determine e.g. that an action topic and an entity topic are referenced in a common sentence for example.

Application 270 running NLP process 182 can include application 270 processing text based data which may be returned by application 270 running speech to text process 183 to convert received voice based data into text based data. With use of such described text processing application 270 running NLP process 182 defines a Text Tone Analyzer process which measures the textual transcript of what a user said as they conduct a conversation with a digital assistant. This processing includes analysis of word choice to perform linguistic analysis.

Processing by application 270 running NLP process for return of NLP output parameter values need not include converting speech to text. Application 270 running NLP process 182 can include application 270 classifying voice samples into sentiment classifications. A speech NLP process can use acoustic characteristics of emotions to classify speech samples into sentiment classifications. Table A below depicts a decision data structure for use in associating various voice characteristics into sentiment classifications. With use of a decision data structure e.g. as depicted in Table A (Murray & Arnott (1993) application 270 can return sentiment parameter values in dependence on various voice conditions.

TABLE A

|  | Fear | Anger | Sadness | Happiness | Disgust |
|---|---|---|---|---|---|
| Speech Rate | Much Faster | Slightly Faster | Slightly Slower | Faster or Slower | Very Much Slower |
| Pitch Average | Very Much Higher | Very Much Higher | Slightly Lower | Much Higher | Very Much Lower |
| Pitch Range | Much Wider | Much Wider | Slightly | Much Wider | Slightly |

TABLE A-continued

|  | Fear | Anger | Sadness | Happiness | Disgust |
|---|---|---|---|---|---|
| Intensity | Normal | Higher | Narrower Lower | Higher | Wider Lower |
| Voice Quality | Irregular Voicing | Breathy Chest Tone | Resonant | Breathy Blaring | Grumbled Chest Tone |
| Pitch Changes | Normal | Abrupt on Stressed Syllables | Downward Inflection | Smooth Upward Inflections | Wide Downward Terminal Inflections |
| Articulation | Precise | Tense | Slurring | Normal | Normal |

With use of voice processing as set forth in connection with Table A Application 270 running NLP process 182 defines a Voice Tone Analyzer process which measures the sound of the user's voice as they conduct a conversation with a digital assistant. This processing examines tone of voice, speech patterns, speech speed, and other data such as listed in Table A. Application 270 running NLP process 182 in one embodiment can employ predictive models trained by machine learning. Application 270 can use e.g. word2vector modeling of a user conversation to find principal data and/or term frequency-inverse document frequency (TF-IDF) modeling of a user conversation to find principal data.

Application 270 running predicting process 184 can include application 270 performing various processes, such as, training predictive models, e.g. with use of historical conversation data including recently stored conversation data. Application 270 miming predicting process 184 can also include, e.g. querying trained predictive models for return of predictions as to, e.g. a future exhibited sentiment parameter values predicted to be exhibited by a user during a subsequent time period and/or a future topic predicted to be represented by speech of a user during a subsequent time period.

Application 270 running intelligent control process 185 can include application 270 in dependence on returned one or more prediction, adjusting, e.g. a storage setting, a security setting, and/or a hosting configuration setting of computing environment 140. For example, in dependence on a predicted cognitive state of a user for a subsequent time period and/or a predicted conversation topic of a user for a subsequent time period, application 270 can adjust a storage setting so that incoming conversation data is stored using a different storage path, e.g. SAN or NAS and/or to a different storage device, e.g. hard disk or SSD. In dependence on a predicted cognitive state for a subsequent time period and/or predicted conversation topic of a user for a subsequent time period, application 270 running intelligent control process 185 can adjust a security setting to change an encrypted process for encrypting incoming conversation data. Application 270 running intelligent control process 185 can in dependence on a predicted cognitive state for a subsequent time period and/or a predicted conversation topic of a user for a subsequent time period can adjust a hosting configuration of computing environment 140 so that computing environment changes an availability of computing environment 140 to a different availability rating so that computing environment 140 provides availability in accordance with a different availability Service Level Agreement (SLA) rating.

Application 270 can be supported by data of data repository 248 defined within storage system 240. Data of data repository 248 can include users area 2481, models area 2482, and decision data structures area 2483.

Data repository 248 in users area 2481 can store data respecting various users of system 100. In users area 2481 there can be stored various signature characteristics of users so that users can be readily recognized by system 100 to thereby improve performance of system 100. For example, where application 270 is able to recognize a particular user, application 270 can activate a particular trained model associated to that particular user, wherein that particular trained model is able to predict, based on historical data for that user, behavior of the user, e.g. in terms of a predicted future sentiment parameter value of the user and/or a predicted future topic of that user.

Data repository 248 in models area 2482 can store one or more predictive model for use in predicting behavior of one or more user having profiles stored in users area 2481. Models of models area 2482 can be trained with training data described in reference to predicting process 184 and queried using data queries as described in connection with predicting process 184.

Data repository 248 in decision data structures area 2483 can store various decision data structures for return of artificial intelligence (AI) action decisions, e.g. decisions in respect to a sensitivity rating to be assigned in associated with a determined topic. Numerous decision data structures can be stored within decision data structures area 2483.

Additional aspects of system 100 are described in connection with the flowchart of FIG. 2 describing operations of application 270 interacting with VEPA 120, storage system 240, news aggregator system 150, and manager 210.

Figure 2:
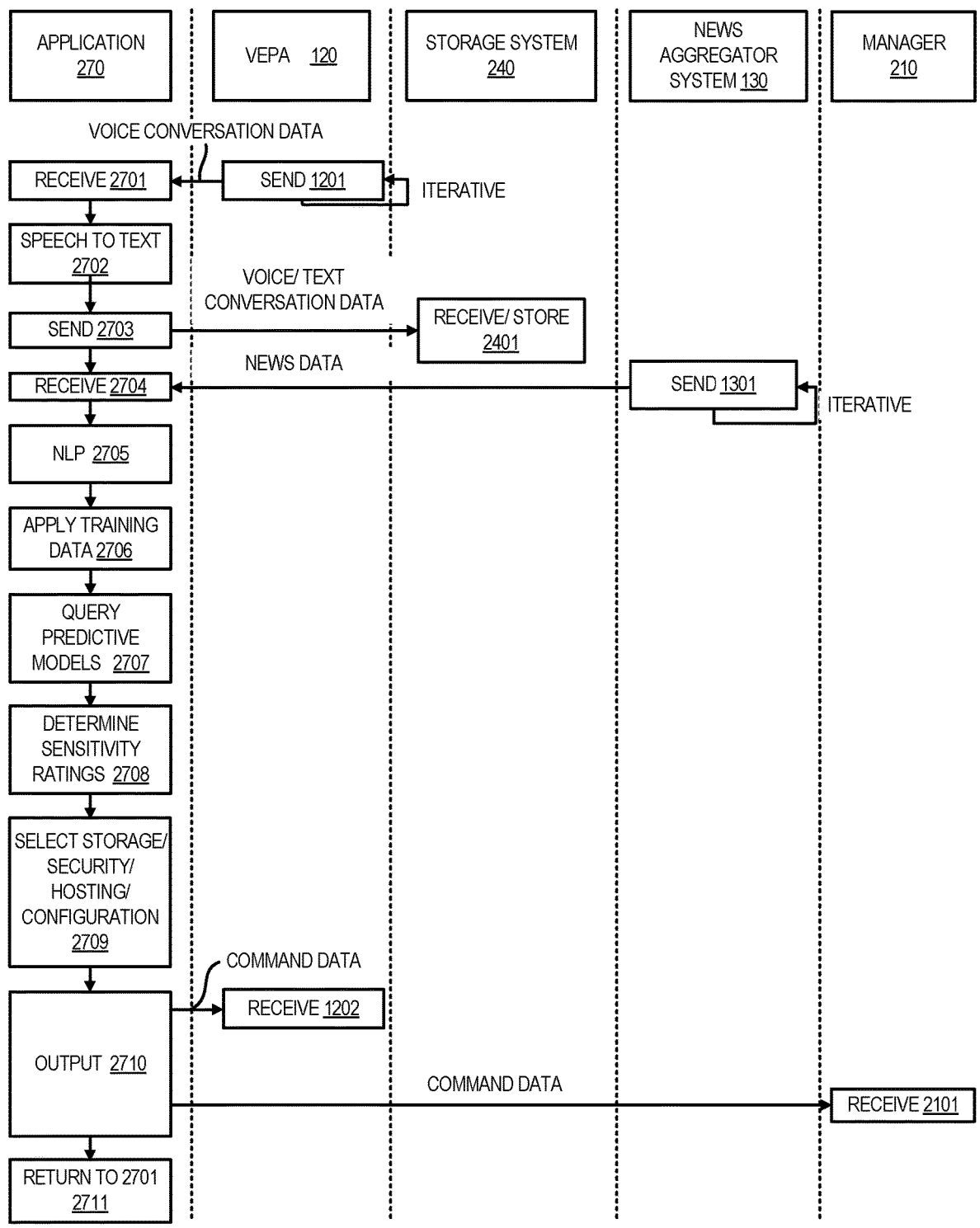
FIG. 2 is a flowchart illustrating a method for performance by a manager system according to one embodiment.

Referring to the flowchart of FIG. 2, VEPA 120 at block 1201 can be iteratively sending voice conversation data for receipt by application 270 at block 2701. Voice conversation data iteratively received at block 2701 can be segmented, e.g. in accordance with arbitrary predetermined time periods or can be segmented using features of voice data, e.g. pauses between spoken words.

On completion of block 2701 application 270 can proceed to block 2702 to perform speech to text processing. Application 270 performing block 2702 can include application 270 activating speech to text process 183 as described in connection with FIG. 1. On completion of block 2702, application 270 can proceed to block 2703.

At block 2703, application 270 can send voice and/or text conversation data for receipt and storage by storage system 240 at block 2401. Storage system 240 in turn can receive and store the sent conversation data at block 2401. With the sending of voice and/or text conversation data for storage at block 2703, application 270 can encrypt voice and/or text data in accordance with a current encryption functional setting associated to application 270. Application 270 performing block 2703 can send voice and/or text conversation data for storage in accordance with a current storage functional setting. The current storage functional setting can have a current storage path, e.g. SAN or NAS, a current storage device, e.g. hard disk or SSD, and/or a current redundancy level, e.g. RAID level. On completion of block 2703, application 270 can proceed to block 2704.

At block 2704, application 270 can be iteratively receiving news data from news aggregator system 150. News data can include news regarding current events. At any given time, various news events can be exhibited cycles that can be tracked by news aggregator system 150. News aggregator system 150 can identify a news event that is reported with multiple mentions for multiple sources of publication and can track the mentions of each identified news events. News events can be classified by topic and can include such topics as (a) "football championship"; (b) "entertainment award show"; (c) negative financial report; (d) "technology breakthrough"; or (e) "health epidemic". News aggregator system 150 can pre-tag news items by topic as indicated or else news aggregator system 150 can include text based news reports or audio based news reports that are partially or entirely unstructured. News aggregator system 150 can be iteratively sending news data at block 1301.

Embodiments herein recognize that topics of conversation of a user who is interacting with VEPA 120, e.g. where VEPA 120 runs an interactive research support process can follow topics of current events, e.g. can exhibit a pattern in dependence on current events. For example, if a user is exposed to a news reporting of a negative financial report the user may be inclined to use VEPA 120 to make adjustments in the user's financial investment portfolio. As another example, where a user is exposed to a news reporting of a new health epidemic a user may use VEPA 120 to perform research regarding the health epidemic including, e.g. by scheduling doctor visits. In such a scenario the user may also e.g. perform ordering prescription medicine and the like. As another example, a user may be following reporting of a football championship and may wish to use VEPA 120 to research statistics on participating player performance.

At block 2705, application 270 can activate NLP process 182 to perform NLP processing at block 2705. At block 2705, application 270 can process received voice and/or text to return sentiment parameter values for the various sentiments, e.g. "anger," "disgust," "fear," "joy," and "sadness." Application 270 at block 2705 can return sentiment parameter values on a scale of 0.0 to 1.0 wherein 0.0 is the minimal value and 1.0 is the maximum value. Accordingly, a sentiment parameter value of fear=0.5 can indicate a moderate level of fear and the sentiment parameter value fear=1.0 can indicate a maximum level of fear and so on. Application 270 performing NLP process 182 at block 2705 can include application 270 processing voice data and/or text data. Application 270 processing voice data can include application 270 referencing the chart of Table A which can be used to associate various voice characteristics classifications to sentiment parameter values. Application 270 at block 2705 can in addition or alternatively process text data, e.g. as returned at block 2702 for a return of sentiment parameter values.

At NLP processing block 2705 application 270 can further return topics associated to the received voice conversation data received at block 2701 in the most recent sample received at block 2701. According to one embodiment, news data received at block 2704 can be pre-tagged with topic data specifying topics associated to received news data. However, in some scenarios, news data can be unstructured, e.g. can be without topic tags and application 270 at NLP processing block 2705 can perform NLP process 182 to return topics tags for association with received news data. Embodiments herein recognize, as noted previously, that topics of users when interacting with VEPA 120 can follow topics of news items that are aggregated by news aggregator system 150 and represented in news data received by application 270 at block 2704. On completion of block 2705, application 270 can proceed at block 2706.

At block 2706, application 270 can apply training data to one or more predictive models. Predictive models can include e.g. (a) predictive models to predict, exhibited cognitive states of users, e.g. sentiment parameter values of users being exhibited topics of users; (b) predictive models to predict the topics that are defined by conversation data of a user; and (c) predictive models to predict topics of current news events that are reported by news aggregator system 150.

FIG. 3 illustrates predictive model 3002 for use in predicting a user's future cognitive state. Predictive model 3002 can be iteratively trained with training data. The training data can include sentiment training data of a user. System 100 can maintain N instances for predictive model 3002, one for each of N users of system 100. Predictive model 3002 can employ machine learning processes for training of predictive model 3002 to predict future exhibited cognitive states of users. According to one embodiment, predictive model 3002 once trained can predict an exhibited set of sentiment parameter values for a user during a future time period, e.g. a time period that is one time period ahead of a current time period. Predictive model 3002 once trained can be responsive to query data. In response to input of query data, predictive model 3002 can output a set of sentiment parameter values for a user which indicate predicted exhibited sentiment of a user during a next time period relative to a current time period. Training data for training of predictive model 3002 can be provided in various forms. At block 2706, the application of training data can include use of returned NLP output parameter values generated at block 2705 received from news aggregator system 150. For example, cycle patterns applied as training data can be updated to include data values of the most recently determined data NLP parameter values provided at block 2705.

Referring to FIG. 4, predictive model 4002 shows a predictive model for predicting a future topic of a user. System 100 can maintain N instances of predictive model, one for each of N users of system 100. Predictive model 4002 once trained can predict an exhibited topic of a user during a next time period relative to a current time period. The exhibited topic of a user can be a topic represented by conversation data of a user. Predictive model 4002 can be trained using machine learning processes. Once trained, predictive model 4002 can be responsive to query data. On application of query data input into predictive model 4002, predictive model 4002 can return and output provided by a predicted topic exhibited by the user during a next period. Training data for training of predictive model 4002 can take on various forms.

Referring to FIG. 5, predictive model 5002 depicts a predictive model for predicting a future news event as may be aggregated and reported by news aggregator system 150. Predictive model 5002 can be iteratively trained using machine learning processes. Predictive model 5002, once trained, can be responsive to query data. Query data can be input into predictive model 5002 and in response predictive model 5002 can return a prediction as to a set of topics associated to various news stories from various news outlets as aggregated by news aggregator system 150. Training data for training of predictive model 5002 can take on various forms.

Figure 6:
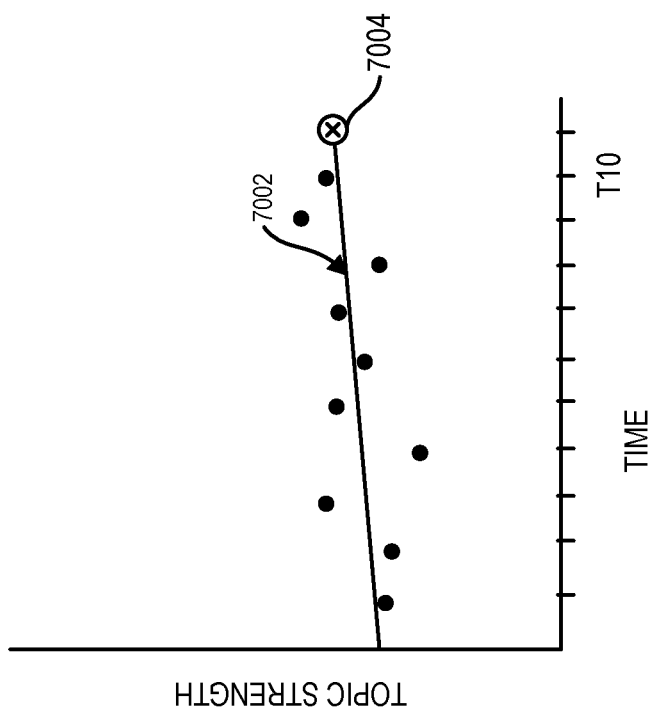
FIG. 6 depicts breach positions at different perimeter locations of a geofence over the course of different time periods according to one embodiment.

According to one embodiment, training data can include sample data for a predetermined number of previous time periods including the most recent time period. FIG. 6 illustrates training data that can be applied for training of predictive model 3002 according to one embodiment. Referring to FIG. 6, the applied set of data values can be sample data specifying "fear" sentiment parameter values for time periods T1 to T10 and the lower set of plotted values can be sample "anger" sentiment parameter values for time periods T1 to T10. Predictive model 3002 according to one embodiment can be configured to establish a regression analysis function in dependence on received training data. For applying training data into predictive models 3002, 4002, and 5002 at block 2706, application 270 can use the most recent sentiment and topic parameter values returned at block 2705, i.e. can update the training data sets to include the most recently returned values and preceding values.

Predictive model 3002 based on received training data can establish regression line 6002 for predicting a period of sentiment value for the user during a next time period and can establish regression line 6004 for use in returning a predicted "anger" sentiment value for the user during a next time period. Using regression line 6002 predictive model 3002 in response to applied query data can user regression line 6002 to return the prediction that the data value 6006, as depicted in FIG. 6, is the predicted "fear" sentiment parameter value for the user during a next time period and using established regression line 6004 can determine that the value 6008 is the returned predicted "anger" sentiment parameter value for the user during a subsequent time period e.g. next time period, T11, or another future time period e.g. time period T12.

Figure 7:
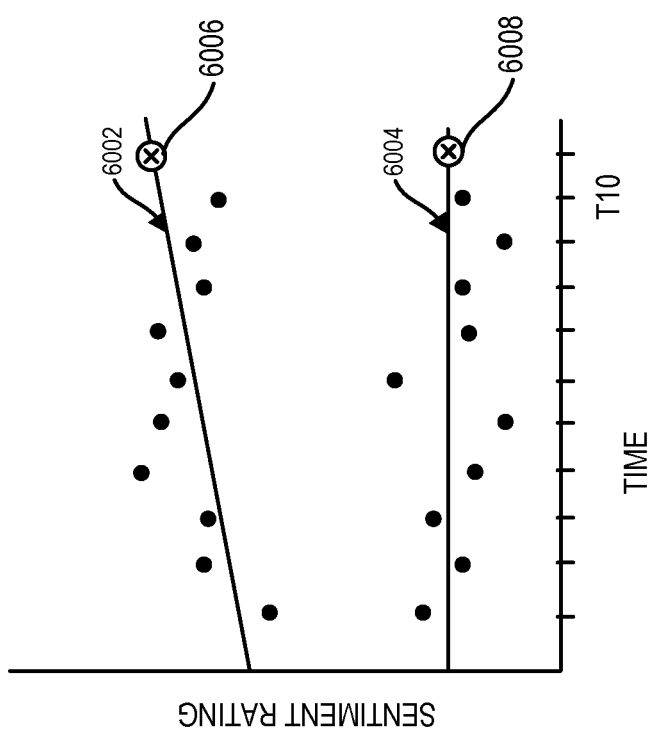
FIG. 7 depicts geofence breach determination data and regression analysis thereof according to one embodiment.

FIG. 7 illustrates representative training data for use in training predictive model 4002 of FIG. 4 and/or predictive model 5002 of FIG. 5. The plotted data values of FIG. 7 can be topic confidence level data values for a particular topic over a set of time periods T1-T10. There can be represented within received conversation data or newsfeed data one or more topic. The sample data of FIG. 7, according to one embodiment can represent confidence level of a topic classification for a user associated to conversation data of the user, or according to another embodiment, the data of FIG. 7 can represent a trending current event news topic. Topic confidence level associated to a user's conversation data can be based, e.g. strength of word association to a topic, or the context of the groups of words, as may be determined using supervised machine learning. Topic confidence level in the case of news data can be, e.g. can be aggregated from confidence levels attributable to individual news reports, so that the confidence level is increased with an increased frequency news reports returning a certain topic classifier above a threshold confidence level.

Referring to FIG. 7, application 270 can establish regression line 7002 based on the sample data. Accordingly, using regression 7002 application 270 can return the prediction that the topic strength of the topic represented in FIG. 7 is the data value 7004 predicted during the next time period. Training data for use in training predictive models 3002, 4002, and 5002 as depicted in FIGS. 3-5 can take on alternative forms.

Figure 8:
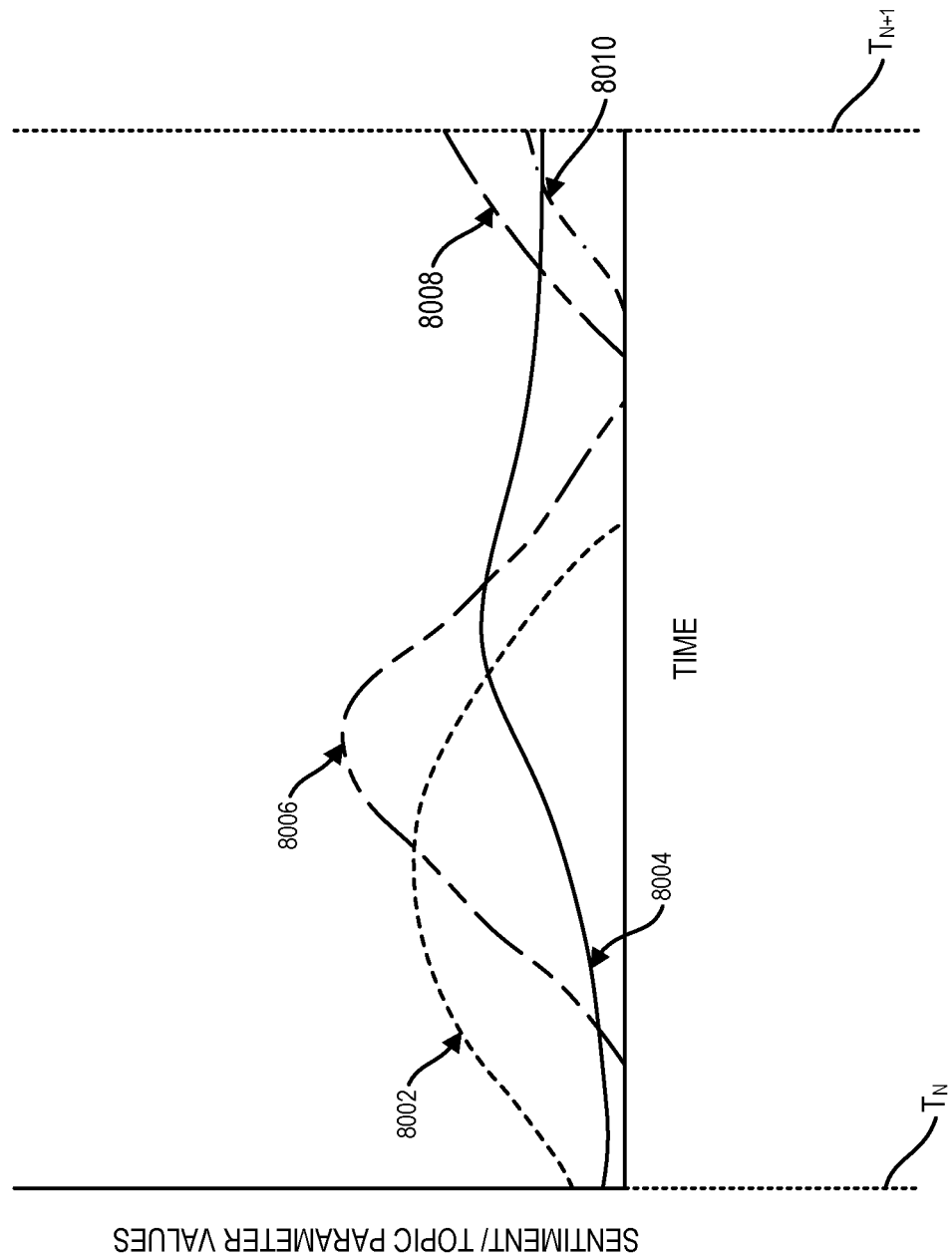
FIG. 8 depicts a geofence migrating throughout an environment according to one embodiment.

Embodiments herein recognize that topic parameter values exhibited by a user and returned by a news aggregator system 150 can exhibit a cycle pattern over time. Datasets exhibiting cycle patterns during an arbitrary time window between time TN and time TN+1 are depicted in FIG. 8. FIG. 8 depicts sentiment parameter values or topic parameter values over time. According to one embodiment, the cycle patterns depicted in FIG. 8 can represent sentiment parameter value cycle patterns. In FIG. 8 there are depicted cycle patterns 8002, 8004, 8006, 8008, and 8010. Each cycle pattern can be characterized by data values defining the cycle pattern characterized by the values exceeding a low threshold, increasing in value, and the decreasing over time to the value below the low threshold. However, the shapes of the cycle patterns can be differentiated substantially. For example, cycle pattern 8004 is substantially longer than cycle pattern 8002. The initial data values of cycle pattern 8004 increase at a slower rate than the initial data values of cycle patterns 8002 and 8006.

Embodiments herein recognize that an exhibited sentiment parameter value for a certain sentiment parameter exhibited by a certain user may tend to exhibit a similar cycle pattern, each instance in which the user exhibits values the certain sentiment parameter according to a cycle pattern. Similarly, embodiments herein recognize that topic cycle pattern for a certain topic exhibited by a certain user may be exhibited similarly by a user each time the certain user exhibits a new topic cycle pattern. Likewise, embodiments herein recognize that a topic parameter value reported by a news aggregator system 150 can tend to be exhibited similarly each time there is a topic classified according to a common classification.

With reference again to FIGS. 3-5, applied training data for training of predictive models 3002, 4002, and 5002 respectively, can include cycle pattern data. For example, where cycle pattern 8002 is a prior "fear" sentiment parameter cycle pattern for a user, application 270 for training predictive model 3002 can include the cycle pattern 8002 and end prior cycle patterns of the user where that user exhibited "fear" parameter values according to a cycle pattern satisfying one or more criterion, e.g. exceeding below a threshold, rising, and then falling below the low threshold. Similar training data for remaining sentiment parameter values can be applied for the remaining sentiment parameter values. Predictive model 3002 trained as described can be configured to learn the cycle patterns that tend to be exhibited by a user when exhibiting a certain sentiment exhibited by a user, e.g. "anger," "disgust," "fear," "joy," and "sadness." Application 270 can then use the trained predictive model 3002 to perform its prediction. Namely, the sentiment parameter value exhibited by a user can be predicted to follow a trend according to the aggregate trend. For example, application 270 querying predictive model 3002 can determine that a current time is a time corresponding to a predicted cycle pattern wherein the sentiment parameter value is falling in accordance with a determined falling curve shape that can be expressed as a mathematical formula. Application 270 can therefore predict that a next time period data value will be in accordance with the falling portion of the fitted curve, a value less than the current value.

In the manner described with reference to predictive model 3002, predictive models 4002 and 5002 can be trained with use of training data provided by cycle pattern data having cycle pattern waveform shapes as depicted in FIG. 8. That is, embodiments herein recognize that a news trend regarding health epidemic may exhibit a determinable trend that is different from a trend exhibited by a negative financial report topic. According to one embodiment, cycle pattern 8002 can represent a football championship topic trend cycle, cycle pattern 8004 can represent a negative financial report topic cycle pattern, cycle pattern 8006 can represent a health epidemic topic trend cycle, cycle pattern 8008 can represent an entertainment award show topic cycle pattern, and cycle pattern 8010 can represent a technology breakthrough topic cycle pattern in one instance.

According to one use case, the cycle patterns 8002, 8004, 8006, 8008, and 8010 can represent sentiment parameter value cycle patterns for a user for the different sentiment parameters "anger," "disgust," "fear," "joy," and "sadness." According to another use case, the different cycle patterns 8002, 8004, 8006, 8008, and 8010 can represent different topic parameter values for a user for different certain topics over time represented in a certain user's conversation data. According to one embodiment, the different cycle patterns 8002, 8004, 8006, 8008, and 8010 can represent different topic cycle patterns that are reported by news aggregator system 150 and received as news data at block 2704.

Various available tools, libraries, and/or services can be utilized for implementation of predictive model 3002, predictive models 4002 and 5002. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by can provide access to libraries and a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive models 3002, 4002, and 5002 can include use of e.g. regression analytics e.g. as described in connection with FIGS. 6 and 7, support vector machines (SVM), Bayesian networks, neural networks and/or other machine learning technologies.

In response to completion of block 2706, application 270 can proceed to block 2707. At block 2707 application 270 can query predictive models 3002, 4002, and 5002 for return of predicted sentiment parameter values exhibited by the current user for a subsequent time period, predicted topic parameter values exhibited by the current user for a subsequent time period, and predicted topic parameter values for a subsequent time period exhibited by news data received from news aggregator system 150.

Application 270 on completion of block 2707 to return predicted sentiment and topic parameter values can proceed to block 2708.

At block 2708, application 270 based on the returned predicted parameter values for sentiment and topic parameter values returned at block 2707 can determine a sensitivity rating associated to subsequent conversation data predicted to be received from a user as received from VEPA 120. Application 270 performing block 2708 can include application 270 using the formula of Eq. 1 as follows.

$$S = S_1 W_1 + S_2 W_2 \quad \text{(Eq. 1)}$$

Where S is a predicted total sensitivity rating assigned to subsequent time period conversation data. $S_1$ is a predicted sensitivity rating assigned to subsequent time period conversation data according to a first factor, $S_2$ is a predicted sensitivity rating assigned to subsequent conversation data according to a second factor, and $W_1$-$W_2$ are weights associated to the respective factors $S_1$ and $S_2$.

According to one embodiment, with reference to Eq. 1, $S_1$ can be the cognitive state, e.g. sentiment parameter value factor and $S_2$ can be a topic parameter value factor. Application 270 can assign predicted sensitivity ratings for subsequent time period conversation data using Eq. 2 as follows.

$$S_1 = E_1 W_1 + E_2 W_2 \quad \text{(Eq. 2)}$$

Where $S_1$ is a predicted sensitivity value for subsequent time conversation data according to a sentiment factor, $E_1$ is assigned predicted sensitivity rating for incoming next conversation data according to a first sentiment parameter value factor, $E_2$ is assigned predicted sensitivity rating for incoming next conversation data according to a second sentiment parameter value factor, and $W_1$ and $W_2$ are weights associated with factors $E_1$ and $E_2$ of Eq. 2.

Various methods have been described herein for assignment of sentiment parameter values for various parameters including "anger," "disgust," "fear," "joy," and "sadness." Embodiments herein recognize that sensitivity of data can be advantageously associated with predicted "fear" sentiment parameter value. For example, when users discuss sensitive information a significant "fear" sensitive parameter can be exhibited. Referring to Eq. 2, the returned predicted sensitivity value $S_1$ based on exhibited sentiment can be substantially dependent on an exhibited "fear" sentiment parameter value. According to Eq. 2, in one embodiment, the factor $E_1$ can be based on a fear sentiment parameter value, the factor $E_2$ can be provided by an anger sentiment parameter value, and the associated weights $W_1$-$W_2$ can be 0.8 and 0.2 respectively so that the return value $S_1$ is weighted 80% on a predicted exhibited fear sentiment parameter value and 20% on a predicted exhibited anger sentiment parameter value. Thus, where a user is predicted to exhibit a fear sentiment parameter value of 0.9 it is predicted to exhibit an anger sentiment parameter value of 0.5. The returned value $S_1$ can be provided as $S_1 = 0.72 + 0.10 = 0.82$.

Referring again to Eq. 1, application 270 can return predicted sensitivity values in accordance with factor $S_2$ based on predicted topics predicted to be exhibited by a user and/or predicted topics predicted to be reported by news aggregator system 150 during a subsequent time period. According to one embodiment, application 270 can assign sensitivity ratings to topics with use of a decision table stored in decision data structures area 2483 (FIG. 1) where topics are mapped to sensitivity ratings. An example decision data structure, wherein topics are assigned various sensitivity ratings is shown in Table B.

TABLE B

| Row | Predicted Topic | Confidence level | Sensitivity Rating |
| --- | --- | --- | --- |
| 1 | Football championship | 0.4 < C ≤ 0.7 | 0.1 |
| 2 | Football championship | 0.7 < C ≤ 1.0 | 0.2 |
| 3 | Entertainment awards show | 0.4 < C ≤ 0.7 | 0.2 |
| 4 | Entertainment awards show | 0.7 < C ≤ 1.0 | 0.3 |
| 5 | Technology breakthrough | 0.4 < C ≤ 0.7 | 0.6 |
| 6 | Technology breakthrough | 0.7 < C ≤ 1.0 | 0.7 |
| 9 | Health epidemic | 0.4 < C ≤ 0.7 | 0.8 |
| 10 | Health epidemic | 0.7 < C ≤ 1.0 | 0.9 |

Embodiments herein recognize the different topics can be advantageously associated to different sensitivity ratings. For example, referring to Table B, the topic "football championship" is assigned a relatively low sensitivity rating whereas the topic "technology breakthrough" or "health epidemic" can be assigned a relatively high sensitivity rating. For example, where a user is engaging in entertainment activity, such as researching a topic generating the NLP processing derived topic classification of "football championship" there is a lesser likelihood that conversation data of the user will be sensitive and therefore a relatively lower sensitivity rating can be assigned. However, where a current topic, e.g. as determined from user conversation data is "health epidemic" a relatively high sensitivity score can be advantageously assigned. As set forth in connection with table B, determined predicted sensitivity parameter values can be biased toward more neutral values when a confidence level associated to a topic is lower. For example, where a user is using VEPA 120 to research a topic generating the NLP processing derived topic classification of "health epidemic" a user may be entering conversation data utterances having personal healthcare implications, which conversation data can be advantageously assigned a high rating of sensitivity. Application 270 according to one embodiment can assign confidence levels to returned sensitivity parameter values according to topic strength which can be expressed as a confidence level. The description provided in connection with Table B referenced a simplified case where there is a single topic identified in conversation data. Where there are multiple topics, application 270 can set the determined predicted sensitivity value to the highest value as determined from application of data of all of the identified topics.

Application 270 for assigning sensitivity factor $S_2$ of Eq. 1 can use Eq. 3 as follows.

$$T = T_1 W_1 + T_2 W_2 \quad \text{(Eq. 3)}$$

Where $T_1$ is a sensitivity topic factor determined using conversation data and $T_2$ is a sensitivity rating using news aggregator topic data. Embodiments herein recognize that topic trends exhibited by topics extracted by both conversations of a user and topics extracted from data received from news aggregator system 150 can be useful in predicting a sensitivity rating associated with subsequent time period conversation data of a user. For example, embodiments herein recognize that in some cases, conversation data of a user can be influenced by current news trends as sensed and reported by news aggregator system 150. Referring to Eq. 3, $W_1$ and $W_2$ can be weights associated to the respective factors $T_1$ and $T_2$.

According to one embodiment, application 270 can assign the weights $W_1$ and $W_2$ of Eq. 3 based on processing to determine dissimilarity between topic trends exhibited by a user and topic trends being exhibited by news aggregator system 150. For example, according to one embodiment with reference to FIG. 8, topic trends exhibited by a user can exhibit the cycle patterns depicted in FIG. 8 and topic trends exhibited by news aggregator system 150 can be represented by different set of cycle patterns. However, a differentiated set of cycle patterns exhibited by news aggregator system 150 can have similarities between the set of cycle patterns exhibited by the user. Application 270 in using Eq. 3 can compute a dissimilarity score between the set of topic cycle patterns currently being exhibited, e.g. recently by the current user and the set of topic cycle patterns currently, e.g. recently being exhibited in received news data received from news aggregator system 150. The recently received data of the compared datasets can be recently received data of the N most recently sampled time periods.

Embodiments herein recognize that between the topic cycle patterns exhibited by the user and the news aggregator system 150 topic cycle patterns, some cycle patterns present in one of the datasets may be absent altogether from the other datasets. However, some cycle patterns can be present but of different shapes between the respective user and news aggregator system 150 datasets to indicate that the user is being influenced by the news aggregator reported system topic. Where application 270 determines that there is a high degree of dissimilarity between the news aggregator system 150 reported topic cycle patterns and the user topic cycle patterns, application 270 can reduce the value of weight $W_2$ of Eq. 3 so that the impact of factor $T_2$ is less pronounced. By contrast, where application 270 determines a small degree of dissimilarity between the topic cycle patterns of the news aggregator dataset and the topic cycle patterns of the user dataset a value $W_2$ can be biased upwards so that the factor $T_2$ has a greater impact on the overall predicted sensitivity rating for subsequent conversation data of a user in accordance with topic factor $S_2$ of Eq. 1. Application 270 on completion of block 2708 can proceed to block 2709.

At block 2709, application 270 can select one or more functional setting of computing environment 140 responsively to the sensitivity rating predicted for subsequent conversation data of a user predicted using Eqs. 1-3 as set forth herein. The one or more functional setting can include e.g. one or more storage setting, one or more security settings, and/or one o or more hosting configuration settings responsively to the sensitivity rating predicted for subsequent conversation data of a user predicted using Eqs. 1-3 as set forth herein. Application 270 at block 2709 can assign the storage setting using the decision data structure of Table C.

TABLE C

| Row | Predicted subsequent time period conversation data sensitivity rating | Storage path | Storage type | Storage redundancy setting |
|---|---|---|---|---|
| 1 | $0.0 \le S \le 0.1$ | NAS | Disk | RAID 0 |
| 2 | $0.1 < S \le 0.2$ | NAS | Disk | RAID 1 |
| 3 | $0.2 < S \le 0.3$ | NAS | Disk | RAID 2 |
| 4 | $0.3 < S \le 0.4$ | SAN | Disk | RAID 3 |
| 5 | $0.4 < S \le 0.5$ | SAN | SSD | RAID 4 |
| 6 | $0.5 < S \le 0.6$ | SAN | SSD | RAID 5 |
| 7 | $0.6 < S \le 1.0$ | SAN | SSD | RAID 6 |

Referring to Table C, Table C cognitively maps predicted sensitivity ratings predicted for a subsequent time period conversation data of a user with storage settings associated to the predicted sensitivity rating. Storage settings as depicted in Table C can be differentiated in terms of path, NAS, or SAN, storage device type, e.g. disk or SSD, or redundancy setting, e.g. RAID 0 to RAID 6. Referring to Table C, the sensitivity rating used for selection of a storage setting can be determined using Eq. 1. There can be associated to the selection of storage path, a selection of storage type, e.g. as between File Storage and block storage. According to one embodiment, with the selection of a NAS storage path there can be a selection of File Storage as the storage type, and with the selection of a SAN storage path there can be a selection of block storage as the storage type. In one embodiment, application 270 can be configured so that when Row 7 is fired, the storage setting instead of being provided by the selection of SAN; SSD and RAID 6 as set forth by the decision data structure of Table C can be provided by the selection of "no storage". In the case "no storage" is selected application 270 can discard incoming subsequent conversation data on receipt without any processing for NLP parameter value extraction or can discard subsequent conversation data responsively to processing for NLP parameter value extraction.

Redundancy level settings can be specified with use of different RAID (redundant array of independent disks) configurations (levels). RAID configurations (RAID 0 to RAID 6) can employ the techniques of striping, mirroring, and/or parity. RAID configurations can increase a reliability of a data store. The most common RAID configurations are RAID 0 (striping), RAID 1 and its variants (mirroring), RAID 5 (distributed parity), and RAID 6 (dual parity). Embodiments herein recognize that a selection of specific RAID configuration can inherently include an initiation of striping (transition to RAID 0), an initiation of mirroring (transition to RAID 1), an initiation of distributed parity (transition to RAID 5), or an initiation of dual parity (transition to RAID 6).

Further, at block 2709 application 270 can use the decision data structure as set forth in Table D for selection of a security setting. There can be associated with different security settings a different rating of encryption which can be performed by application 270 on received data and/or by VEPA 120 on data that is sent to application 270.

TABLE D

| Row | Predicted subsequent time period conversation data sensitivity rating | Security functional setting |
|---|---|---|
| 1 | $0.0 \le S \le 0.1$ | No encryption |
| 2 | $0.1 < S \le 0.2$ | AES-128 |
| 3 | $0.2 < S \le 0.3$ | AES-128 |
| 4 | $0.3 < S \le 0.4$ | AES-128 |
| 5 | $0.4 < S \le 0.5$ | AES-128 |
| 6 | $0.5 < S \le 0.6$ | AES-128 |
| 7 | $0.6 < S \le 1.0$ | AES-256 |

As shown in Table D, an encryption rating of "no encryption" can be assigned for incoming conversation data having a lowest predicted sensitivity rating of 0.1 or less, AES-128 encryption can be specified for incoming conversation data having a predicted sensitivity rating in the range of greater than 0.1 and 0.6, and an encryption rating of AES-256 can be specified for incoming conversation data predicted to have a sensitivity rating in the range of greater than 0.6 and the maximum 1.0. The predicted sensitivity ratings specified in Table D can be returned using Eqs. 1-3 as set forth herein.

With further reference to block 2709, application 270 can select a hosting configuration setting using the decision data structure of Table E.

TABLE E

| Row | Predicted subsequent time period conversation data sensitivity rating | Availability SLA availability rating |
|---|---|---|
| 1 | $0.0 \le S \le 0.1$ | 3 nines |
| 2 | $0.1 < S \le 0.2$ | 3 nines |
| 3 | $0.2 < S \le 0.3$ | 4 nines |
| 4 | $0.3 < S \le 0.4$ | 5 nines |
| 5 | $0.4 < S \le 0.5$ | 5 nines |
| 6 | $0.5 < S \le 0.6$ | 5 nines |
| 7 | $0.6 < S \le 1.0$ | continuous |

Referring to Table E, application 270 can select different host configuration availability settings in dependence on predicted sensitivity ratings using the decision data structure of Table E. The different host configuration availability settings can include, e.g. 3 nines availability, 4 nines availability, or continuous availability. The predicted sensitivity ratings for next conversation data as specified in Table E can be determined using Eqs. 1-3 as set forth herein. Changing an SLA availability rating can in some circumstances consume significant resources. Application 270 in one embodiment can determine a cost function associated to making a change in an availability rating, and can restrict making the change based on cost exceeding a threshold.

On completion of block 2709 application 270 can proceed to block 2710. At block 2710, application 270 can provide one or more output in dependence on the selections made at block 2709. At block 2710, according to one embodiment, application 270 can send command data to VEPA 120 for receipt by VEPA 120 at block 1202. The command data received by VEPA 120 can be command data to change an encryption function performed by VEPA 120 to the newly selected security encryption selection provided in the preceding block 2709. On receipt of the command data received at block 1202, VEPA 120 can be configured to encrypt next conversation data sent to application 270 in accordance with a security encryption selection provided at the preceding block 2709. Thus, during a next iteration of block 2701 to receive next voice conversation data, the next voice conversation data can be encrypted in accordance with the security encryption selection provided at block 2709.

The one or more output at block 2710 can include one or more output to change and encryption function performed by application 270. For example, referring to receive block 2701, application 270 can be configured to encrypt incoming data and so according to one embodiment, the one or more output provided at block 2710 can include an output to change an encryption function applied for encrypting received data received at block 2701 in accordance with the security encryption selection provided at the preceding iteration at block 2709.

In a further embodiment, the one or more output at block 2710 can include an output to change an encryption function performed when sending data for storage into storage system 240. Referring to send block 2703, application 270 can be configured to perform encryption on all data, e.g. including voice and/or text conversation data sent for storage into storage system 240. Thus, one or more output at block 2710 can include one or more output to change an encryption function associated to block 2703 so that during a next iteration of block 2703, sent data sent to storage system 240 at block 2703 can be encrypted in accordance with a security encryption setting provided at a preceding iteration of block 2710. The one or more output provided at block 2710 can include one or more output to facilitate the storage setting provided at preceding block 2709.

For example, application 270 can be configured to perform send block 2703 in accordance with a current storage setting so that sent data sent at block 2703 to storage system 240 is sent in accordance with a current storage setting. A current storage setting can include a storage path setting, e.g. NAS or SAN and can include a storage type setting, e.g. hard disk or SSD. Accordingly, the one or more output at block 2710 can include one or more output to change a current storage setting at block 2703, e.g. a storage path setting and/or a storage type setting so that during a next iteration of block 2703 data sent at block 2703 is sent in accordance with the recently selected storage setting provided at a preceding iteration of block 2710.

The one or more output provided at block 2710 can include one or more output to facilitate the host configuration setting returned at block 2709. The one or more output at block 2710 can include sending of command data for receipt by manager 210 at block 2101. In response to a change in an SLA availability setting at block 2709, manager 210 at block 2101 in response to the received command data can change a hosting configuration for hosting application 270 to achieve a new SLA availability parameter value rating. In response to the received command data received at block 2101, manager 210 can execute various actions to achieve the updated SLA availability rating, e.g. to increase the availability rating can migrate application 270 to a different computing node stack of computing node stacks 10A-10Z and/or can instantiate a new one or more instance of application 270 on different ones of computing node stacks 10A-10Z while maintaining the instance on computing node stack 10Z. To reduce an availability rating manager 210 can, for instance, migrate application 270 to a different computing node stack of computing node stacks 10A-10Z and/or can stop and delete and instance of application 270 from one or more of computing node stack 10A-10Z while maintaining the instance running on computing node stack 10Z. A number of different responses to the command data received at block 2101 are possible. On completion of block 2710, application 270 can proceed to block 2711.

At block 2711, application 270 can return to block 2701 to receive next voice conversation data which is being iteratively sent at block 1201. During a next iteration of blocks 2701-2703, received conversation data can be encrypted and stored in accordance with new settings provided during a most recent iteration of block 2709 in a hosting configuration for hosting application 270 within computing environment 140 can have changed in accordance with a hosting configuration and selection during a most recent iteration of block 2709. Where voice conversation data received at block 2701 has been encrypted by VEPA 120, VEPA 120 can have encrypted the sent voice conversation data in accordance with updated security selection command data sent by application 270 to VEPA at a most recent iteration of block 2709.

Referring to blocks 2702 and 2703, application 270 according to one embodiment can commence the sending of voice conversation at block 2703 prior to the generation of text data from the voice data at block 2702 to ensure fast encryption and secure storage of received conversation data. Embodiments herein recognize that providing of predicted sensitivity ratings for incoming voice conversation data at future times assure that actions of application 270 in respect to storage settings, security settings, and hosting are appropriate for sensitivity ratings associated with currently incoming conversation data. For example, when there is a change in a predicted sensitivity rating of incoming conversation data, storage, security, and host configuration settings can be proactively changed so that changes can be fully implemented in the system ready to receive conversation data changed in accordance with the prediction.

There is set forth herein according to one embodiment a method to adapt storage, privacy, and availability levels to conversations and content with a digital assistant.

Digital assistants can be interacted with using voice commands by a mobile device user. These interactions can be single utterance ("what is the weather today?"), or conversational involving back-and-forth between the user and the digital assistant ("what's on my calendar today?", "OK reschedule my 10 am meeting").

Embodiments herein recognize that as digital assistants become smarter, storing these conversations as well as data associated with retrieval becomes important for recall later. This enables the digital assistant to quickly and securely apply context based on conversations that have happened in the past. For example, a user may initially ask "how did my team the Utopia Wildcats do this week?", then the following week ask, "how did my team do?". The digital assistant can recall the previous conversation to establish which team the user is referring to.

This disclosure addresses how these conversations along with content retrieved to answer a question with a digital assistant are stored and protected. It describes a system that can analyze both a user's tone of voice and choice of words to derive the importance and privacy of a given conversation and assigns appropriate storage setting and encryption levels based upon this analysis. This ensures that important information is stored in storage arrays, quick access, cost effective solutions with the most appropriate redundancy, and that highly private information is stored with the highest levels of encryption.

A storage setting herein can specify a storage type, e.g. as between File Storage and Block Storage. With File Storage, data can be stored in a hierarchical structure that is generally composed of directories and files. Data stored with use of File Storage can be accessed with e.g. Network File System (NFS) or Server Message Block (SMB). With Block Storage data can be stored in volumes generally on a SAN. More complex than File Storage but much more flexible.

A storage setting herein can specify a storage device type, e.g. as between hard disk and SSD. SSD can refer to Solid State Drives that use integrated circuits to store data. The circuits are static and do not move.

A host configuration herein can specify an availability level. Continuous Availability herein can refer to Operational efficiency and Service Level Agreement where a computing system does not have any planned or unplanned down time (following the Brewer's CAP theorem). High Availability herein can refer to a system that has 5 nines availability (five and half minutes of downtime per year).

A storage setting herein can specify a redundancy level. According to one embodiment, a redundancy level can specify a Redundant Array of Independent Disk (RAID) configuration. RAID configuration can include seven RAID configurations, RAID 0 to RAID 6. Striped storing can include distributing sequential data elements onto different storage computing elements to prevent total loss of data if one storage medium is lost. Mirrored storing can include the creation of redundant copies of data through data replication There is set forth herein a system according to one embodiment in which: (1) User intent and cognitive state is correlated together through a merge mode; (2) User intent and cognitive state can be forecasted one or more cycles into the future for long term encryption and data storage type; and (3) principal data detection for functional settings e.g. storage settings, security settings, and/or host configurations settings such as involving SLA parameter value availability settings e.g. as between continuous availability (CA) and high availability (HA).

Embodiments herein can include, for example, (1) distributing knowledge elements within a topical knowledge space; (2) exploring a human mind by changing context during a conversation including analyzing how the stress of a person changes based on current events; (3) activating learning based on trending somatic changes of a user based on long short-term memory (LSTM); (4) selecting encryption levels based on topical cluster ratings; (5) selecting availability levels based on topical cluster ratings; (6) selecting storage levels based on topical cluster ratings; (7) combining topical knowledge ratings with active learned somatic trends; (8) forecast future somatic states with the trending news.

According to one embodiment a user can initiate a conversation with a digital assistant. Regarding stage (1) each utterance received by the digital assistant can be subject to speech to text conversion to create a written transcript of the conversation. A cognitive system can analyze conversation to derive emotional states. The conversation conducted between a mobile device user and a digital assistant can be further analyzed by a cognitive system. The cognitive system can utilize multiple services such as a (a) Voice Tone Analyzer that can measure the sound of the user's voice as they conduct a conversation with a digital assistant. This service considers tone of voice, speech patterns, speech speed, and so forth and (b) a Text Tone Analyzer that can measure the textual transcript of what a user said as they conduct a conversation with a digital assistant. This service analyzes word choice to perform linguistic analysis.

Regarding stage (2) the output of the analysis can be used to derive the user's mood and state of mind based upon what they said (the words used), and how they said it (tone of voice). The analysis can provide measurements for the following attributes of cognitive state such as: Emotional state (anger, disgust, fear, joy, sadness); Language style (analytical, confident, tentative); Social tendencies (openness, conscientiousness, extraversion, agreeableness, emotional range)

Regarding stage (3) there can then be provided an assignment of appropriate storage and privacy of conversation. Using the output of Stage 2 the system can derive how the conversation should be stored for later retrieval. The system can provide an assignment for: (a) Storage type, i.e. which storage array should be used to store the conversation. Options can include: (i) No storage, i.e. the conversation is deemed unimportant or is considered too private to risk storing, and (i) base level storage, i.e. the conversation is of normal importance and is stored in a base storage array, for example RAID 1, or (iii) highly redundant storage, i.e. the conversation is of critical importance is stored in a highly redundant storage array, for example RAID 6. The system can provide an assignment for: (b) a security setting. A security setting can specify what level of encryption should be applied to a conversation. Options include: (i) no encryption, i.e., the conversation is not considered in any means private; (b) base level encryption, i.e., the conversation requires a base level of privacy and is assigned, for example, AES-128 level encryption, or (iii) advanced level encryption, i.e. the conversation is of a high level of privacy and is assigned, for example, AES-256 level encryption.

Certain embodiments herein may offer various technical computing advantages involving computing advantages to address problems arising in the realm of computer systems and computer networks. Embodiments herein for example, can employ NLP to extract a cognitive state and topics from incoming conversation data of a user who is using a voice enabled personal assistant (VEPA) in dependence on a determined cognitive state and/or topic, settings of a computing environment can include settings in respect to, e.g. storage, security, and/or host configuration. According to one embodiment, a changed storage setting can include a changed storage path setting, e.g. that designate NAS or SAN and a change storage setting can include a changed storage device type, e.g. hard disk or SSD, changed security settings can include changed encryption functions that are performed by a VEPA and/or by an application running in a computing environment, changed host configuration settings to achieve new SLA parameter values. Changed host configuration settings can include associated actions to migrate an application, delete an instance of an application, or add an instance of an application for example. Conversation data received and processed by an application for determination of cognitive state parameter values and/or topic parameter values can include conversation data between a user and a VEPA or conversation data between users, e.g. conversation data between users which are picked up by VEPA. According to one embodiment, an application running within a computing environment can determine predictions as to a user's cognitive state and user topics at a future time and can proactively provide one or more output to facilitate changed functions in accordance with computing environment settings so that a computing environment proactively responds prior to changes and exhibited cognitive state and/or topics occurring.

Figure 9:
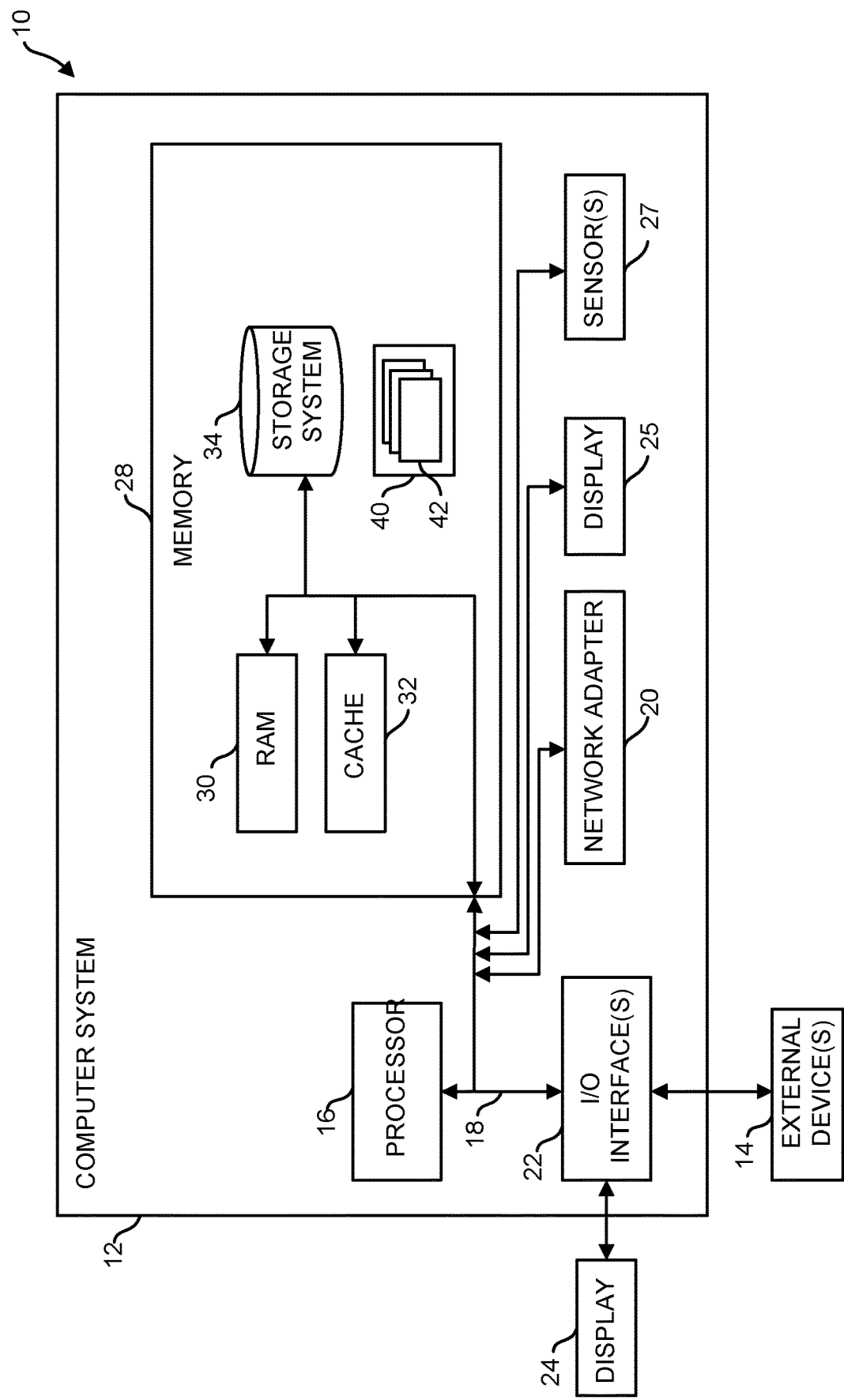
FIG. 9 depicts a computing node according to one embodiment.
Figure 10:
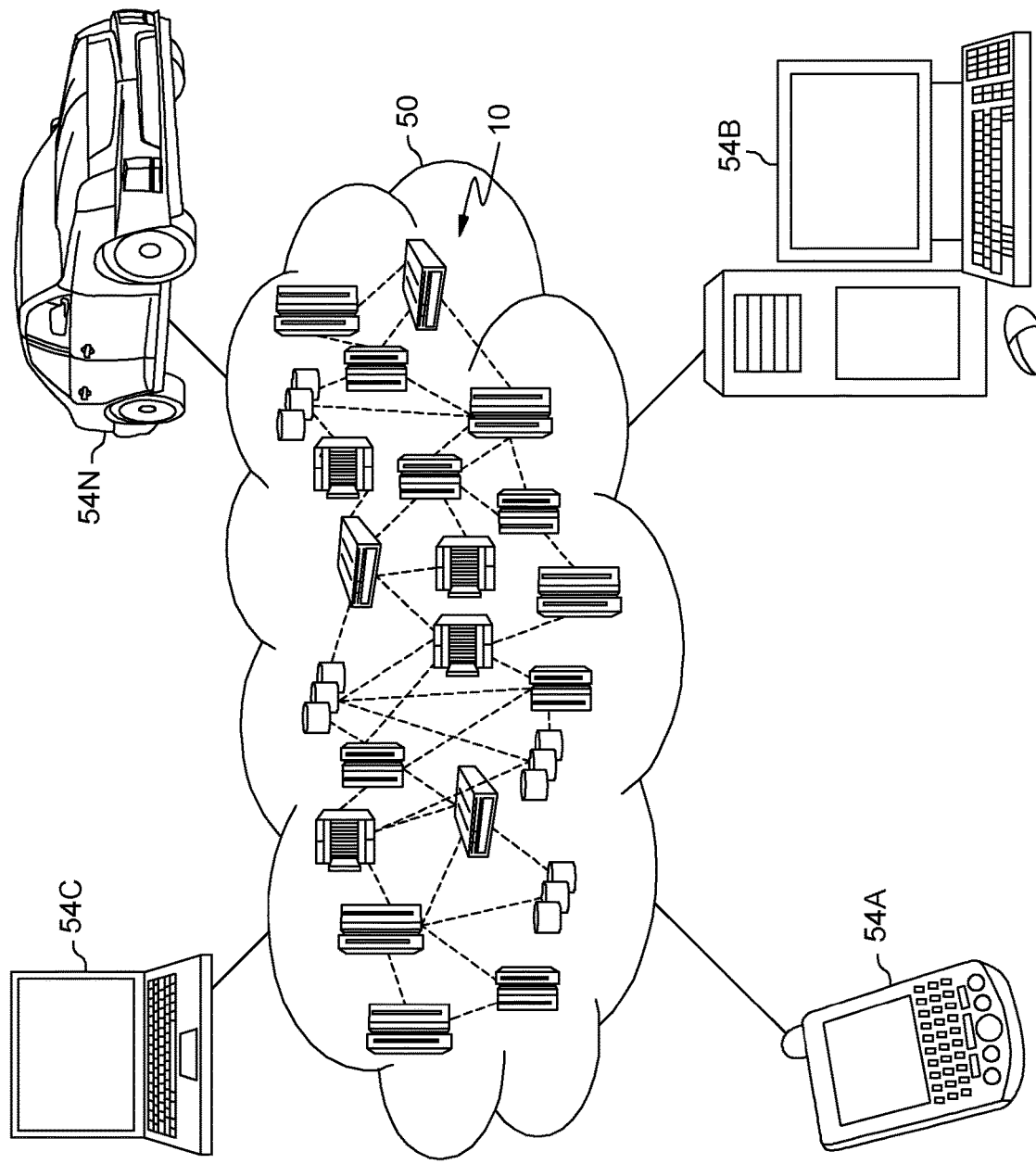
FIG. 10 depicts a cloud computing environment according to one embodiment.
Figure 11:
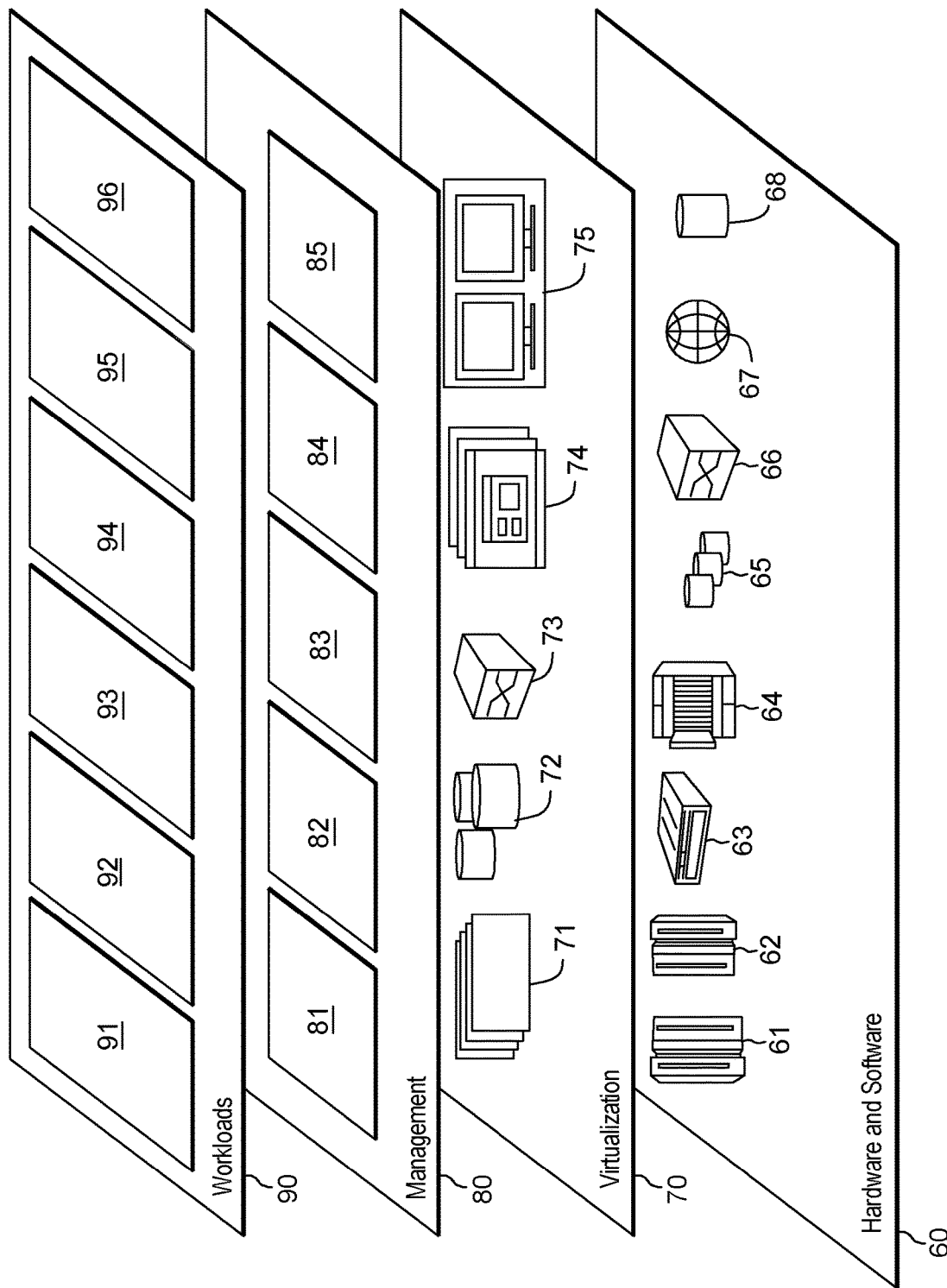
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher rating of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, computing node 10 and can include one or more program 40 defining application 270 for performing functions described with reference to application 270 as set forth in the flowchart of FIG. 2. In one embodiment, VEPA 120 can include one or more computing node 10 and can include one or more program 40 for performing functions described with reference to one or more client computer device VEPA 120 as set forth in the flowchart of FIG. 2. In one embodiment, news aggregator system 150 can include one or more computing node 10 and can include one or more program 40 for performing functions described with reference to news aggregator system 150 as set forth in the flowchart of FIG. 2. In one embodiment, manager 210 can include one or more computing node 10 and can include one or more program 40 for performing functions described with reference to manager 210 as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for examining conversation data for updating functional settings as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
receiving conversation data of a user from a data source, the data source being provided be a voice enabled personal assistant (VEPA);
processing the conversation data to return a sentiment parameter value and a topic parameter value for the conversation data;
updating one or more functional setting of a computing environment in dependence on the sentiment parameter value and the topic parameter value;
receiving subsequent conversation data from the data source; and
processing the subsequent conversation data in accordance with the updated one or more functional setting, wherein the method includes migrating an application performing the receiving the conversation data and the processing the conversation data to a different computing node stack responsively to the updating so that the receiving the subsequent conversation data and the processing the subsequent conversation data are performed by the application running on the different computing node stack.

2. The computer implemented method of claim 1, wherein the one or more functional setting includes a functional setting selected from the group consisting of: a storage setting, a security setting, and a host configuration setting.

3. The computer implemented method of claim 1, wherein the method includes predicting a sensitivity rating for subsequent conversation data of the user using the sentiment parameter value and the topic parameter value, wherein the updating includes performing the updating responsively to the sensitivity rating for the subsequent conversation data of the user.

4. The computer implemented method of claim 1, wherein the method includes predicting a sensitivity rating for subsequent conversation data of the user using the sentiment parameter value and the topic parameter value, wherein the updating includes performing the updating in dependence on the sensitivity rating, wherein the predicting a sensitivity rating for the subsequent conversation data of the user includes (a) predicting a subsequent sentiment parameter value for the subsequent conversation data of the user (b) predicting a subsequent topic parameter value for the subsequent conversation data of the user; and (c) applying a formula having a first factor in dependence on the subsequent sentiment parameter value and a second factor in dependence on the subsequent topic parameter value.

5. The computer implemented method of claim 1, wherein the method includes predicting a sensitivity rating for subsequent conversation data of the user using the sentiment parameter value and the topic parameter value, wherein the updating includes performing the updating in dependence on the sensitivity rating, wherein the predicting a sensitivity rating for the subsequent conversation data of the user includes (a) predicting a subsequent sentiment parameter value for the subsequent conversation data of the user (b) predicting a subsequent topic parameter value for the subsequent conversation data of the user; and (c) applying a formula having a first factor in dependence on the subsequent sentiment parameter value and a second factor in dependence on the subsequent topic parameter value, wherein the predicting a subsequent sentiment parameter value for the subsequent conversation data of the user includes using a first predictive model that has been trained using the sentiment parameter value and prior sentiment parameter values for prior conversation data of the user, wherein the predicting a subsequent topic parameter value for the subsequent conversation data of the user includes using a second predictive model that has been trained using the topic parameter value and prior topic parameter values for prior conversation data of the user.

6. The computer implemented method of claim 1, wherein the method includes predicting a sensitivity rating for subsequent conversation data of the user using the sentiment parameter value and the topic parameter value, wherein the updating includes performing the updating in dependence on the sensitivity rating, wherein the predicting a sensitivity rating for the subsequent conversation data of the user includes (a) predicting a subsequent sentiment parameter value for the subsequent conversation data of the user (b) predicting a subsequent topic parameter value for the subsequent conversation data of the user; and (c) applying a formula having a first factor in dependence on the subsequent sentiment parameter value and a second factor in dependence on the subsequent topic parameter value, wherein the predicting the subsequent sentiment parameter value for the subsequent conversation data of the user includes using a predicted subsequent fear sentiment parameter value for the subsequent conversation data, wherein the predicting a subsequent topic parameter value for the subsequent conversation data of the user includes using a decision data structure that cognitively maps topics to sensitivity ratings.

7. The computer implemented method of claim 1, wherein the method includes predicting a sensitivity rating for subsequent conversation data of the user using the sentiment parameter value and the topic parameter value, wherein the updating includes performing the updating in dependence on the sensitivity rating, wherein the predicting a sensitivity rating for the subsequent conversation data of the user includes (a) predicting a subsequent sentiment parameter value for the subsequent conversation data of the user (b) predicting a subsequent topic parameter value for the subsequent conversation data of the user; and (c) applying a formula having a first factor in dependence on the subsequent sentiment parameter value and a second factor in dependence on the subsequent topic parameter value, wherein the predicting the subsequent sentiment parameter value for the subsequent conversation data of the user includes using a predicted subsequent fear sentiment parameter value for the subsequent conversation data, wherein the predicting a subsequent topic parameter value for the subsequent conversation data of the user includes using a decision data structure that cognitively maps topics to sensitivity ratings, and wherein according to the decision data structure a financial related topic is associated to higher sensitivity rating than an entertainment related topic.

8. The computer implemented method of claim 1, wherein the method includes predicting a sensitivity rating for subsequent conversation data of the user using the sentiment parameter value and the topic parameter value, wherein the updating includes performing the updating in dependence on the sensitivity rating, wherein the predicting a sensitivity rating for the subsequent conversation data of the user includes predicting a subsequent topic parameter value for the subsequent conversation data of the user, wherein the predicting a subsequent topic parameter value for the subsequent conversation data of the user includes examining a topic parameter value associated to a news feed received from a news aggregator system and assessing a degree of correspondence between topic trends of the user and topic trends of the news feed.

9. The computer implemented method of claim 1, wherein the one or more functional setting includes a functional setting selected from the group consisting of: a storage setting, a security setting, and a host configuration setting.

10. The computer implemented method of claim 1, wherein the updating the one or more functional setting includes querying of one or more predictive model that predicts an exhibited sentiment parameter value and a topic parameter value for subsequent conversation data of the user.

11. The computer implemented method of claim 1, wherein the updating the one or more functional setting includes using news feed data received from a news feed aggregator system.

12. The computer implemented method of claim 1, wherein the one or more functional setting is a storage functional setting that specifies a storage path setting selected from the group consisting of: Storage Area Network (SAN), and Network Attached Storage (NAS).

13. The computer implemented method of claim 1, wherein the one or more functional setting is a functional setting to establish a service level agreement (SLA) availability parameter value.

14. The computer implemented method of claim 1, wherein the method includes predicting a sensitivity rating for subsequent conversation data of the user using the sentiment parameter value and the topic parameter value, wherein the updating includes performing the updating responsively to the sensitivity rating for the subsequent conversation data of the user, wherein the one or more functional setting includes a functional setting selected from the group consisting of: a storage setting, a security setting, and a host configuration setting.

15. A computer implemented method comprising:
receiving conversation data of a user from a data source, the data source being provided be a voice enabled personal assistant (VEPA);
processing the conversation data to return a sentiment parameter value and a topic parameter value for the conversation data;
updating one or more functional setting of a computing environment in dependence on the sentiment parameter value and the topic parameter value;
receiving subsequent conversation data from the data source; and
processing the subsequent conversation data in accordance with the updated one or more functional setting, wherein the one or more functional setting is a storage functional setting that specifies a storage path setting selected from the group consisting of: Storage Area Network (SAN), and Network Attached Storage (NAS).

16. The computer implemented method of claim 15, wherein the method includes predicting a sensitivity rating for subsequent conversation data of the user using the sentiment parameter value and the topic parameter value, wherein the updating includes performing the updating responsively to the sensitivity rating for the subsequent conversation data of the user.

17. A computer implemented method comprising:
receiving conversation data of a user from a data source, the data source being provided be a voice enabled personal assistant (VEPA);
processing the conversation data to return a sentiment parameter value and a topic parameter value for the conversation data;
updating one or more functional setting of a computing environment in dependence on the sentiment parameter value and the topic parameter value;
receiving subsequent conversation data from the data source; and
processing the subsequent conversation data in accordance with the updated one or more functional setting, wherein the one or more functional setting is a functional setting to establish a service level agreement (SLA) availability parameter value.

18. The computer implemented method of claim 17, wherein the method includes predicting a sensitivity rating for subsequent conversation data of the user using the sentiment parameter value and the topic parameter value, wherein the updating includes performing the updating responsively to the sensitivity rating for the subsequent conversation data of the user.

19. The computer implemented method of claim 17, wherein the method includes predicting a sensitivity rating for subsequent conversation data of the user using the sentiment parameter value and the topic parameter value, wherein the updating includes performing the updating in dependence on the sensitivity rating.

20. The computer implemented method of claim 17, wherein the updating the one or more functional setting includes querying of one or more predictive model that predicts an exhibited sentiment parameter value and a topic parameter value for subsequent conversation data of the user.

\* \* \* \* \*